United States Patent
Wang et al.

(10) Patent No.: US 8,494,602 B2
(45) Date of Patent: Jul. 23, 2013

(54) PORTABLE ELECTRONIC DEVICE

(75) Inventors: Chih-Kuang Wang, Taoyuan County (TW); Ching-Liang Chiang, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 377 days.

(21) Appl. No.: 12/630,851

(22) Filed: Dec. 4, 2009

(65) Prior Publication Data

US 2010/0267428 A1 Oct. 21, 2010

(30) Foreign Application Priority Data

Apr. 16, 2009 (TW) ................................ 98112681 A

(51) Int. Cl.
*H04M 1/00* (2006.01)
(52) U.S. Cl.
USPC .............. 455/575.4; 455/575.1; 455/575.3; 455/347; 455/550.1
(58) Field of Classification Search
USPC ............ 455/550.1, 418, 575.1, 575.3, 575.4, 455/556.1, 556.2, 566, 347
See application file for complete search history.

(56) References Cited

U.S. PATENT DOCUMENTS

| 7,388,578 | B2 * | 6/2008 | Tao | 345/173 |
| 2007/0252202 | A1 * | 11/2007 | Park et al. | 257/335 |
| 2009/0170573 | A1 * | 7/2009 | Harmon et al. | 455/575.4 |

FOREIGN PATENT DOCUMENTS

| CN | 101047729 | 10/2007 |
| EP | 1916826 | 4/2008 |
| GB | 2434274 | 7/2007 |
| TW | 200818842 | 4/2008 |
| TW | 200910906 | 3/2009 |
| WO | 2008066342 | 6/2008 |

OTHER PUBLICATIONS

"First Office Action of China Counterpart Application", issued on Apr. 2, 2011, p. 1-p. 4.
"Office Action of European Counterpart Application", issued on Jul. 20, 2010, p. 1-p. 6.
"European Extended Search Report of European Counterpart Application", issued on Jul. 7, 2010, p. 1-p. 3.
"Office Action of Taiwan counterpart application" issued on Sep. 13, 2012, p. 1-p. 8.

* cited by examiner

*Primary Examiner* — Marcos Torres
(74) *Attorney, Agent, or Firm* — Jianq Chyun IP Office

(57) ABSTRACT

A portable electronic device includes a first body having a first surface and a second surface opposite to each other, a second body movably disposed on the first body covers the first surface, a first frame fixed on the first body, a second frame pivoted to the first frame, and a third frame fixed on the second body and slidably coupled to the second frame. The second frame is capable of sliding between a first position and a second position relative to the third frame. When the second frame is located on the second position relative to the third frame, the first frame is capable of rotating towards the first position from the second position to reach a third position relative to the second frame, such that the second body is capable of being turned over from the first surface to the second surface relative to the first body.

14 Claims, 9 Drawing Sheets

PORTABLE ELECTRONIC DEVICE

CROSS-REFERENCE TO RELATED APPLICATION

This application claims the priority benefit of Taiwan application serial No. 98112681, filed on Apr. 16, 2009. The entirety of the above-mentioned patent application is hereby incorporated by reference herein and made a part of this specification.

BACKGROUND OF THE INVENTION

1. Field of the Invention

The present application generally relates to a portable electronic device, in particular, to a portable electronic device capable of changing among various appearance states.

2. Description of Related Art

With the rapid progress of technologies, electronic devices have become increasingly indispensable in people's daily life. Nowadays, users' requirements on electronic devices generally include a high operation performance, and features of being light, thin, short, and small, and so on. Therefore, various portable electronic devices, including an ultra mobile personal computer (UMPC), a tablet personal computer (tablet PC), a pocket PC, a personal digital assistance (PDA), a cell phone, and a notebook PC have been gradually proposed.

Most of the current portable electronic devices adopt a clam shell body design or a slide-type body design, in which a display screen and a keyboard are respectively located on two overlapped bodies, such that the user can conveniently operate the device. In addition to basic modes of, for example, inputting via the keyboard and wireless communication, the current portable electronic device may also have a multimedia playing function, for example, watching movies, browsing pictures, and even holding video conferences.

In a clam shell portable electronic device, the two overlapped bodies are connected to each other in a pivoting manner, in which an inner surface of an upper body is provided with a screen, and an inner surface of a lower body facing the upper body is provided with a keyboard. When the user intends to play audio/video products or enter a keyboard input mode, he/she may rotate the upper body relative to the lower body, and place the lower body of the portable electronic device on a platform, such that he/she may conveniently operate the device and enjoy the audio/video products.

However, openings of a loudspeaker for certain portable electronic device are disposed on an outer surface of the lower body. As a result, when the loudspeaker of the portable electronic device produces sound effects, the sound transmission is interfered since the openings are covered by the platform where the lower body is placed, and the sound output quality is deteriorated.

SUMMARY OF THE INVENTION

Accordingly, the present application is directed to a portable electronic device, which is capable of changing among various appearance states.

The present application provides a portable electronic device, which includes a first body, a second body, a first frame, a second frame, and a third frame. The first body has a first surface and a second surface opposite to each other. The second body is movably disposed on the first body and covers the first surface. The first frame is fixed on the first body. The second frame is pivoted to the first frame. The third frame is fixed on the second body and slidably coupled to the second frame. The second frame is capable of sliding between a first position and a second position relative to the third frame, such that the second body is capable of sliding relative to the first body. When the second frame is located on the second position relative to the third frame, the first frame is capable of rotating towards the first position from the second position to reach a third position relative to the second frame, such that the second body is capable of being turned over from the first surface to the second surface relative to the first body.

The present application provides an operation method, applicable to operate the portable electronic device. Firstly, the second frame is located on the first position relative to the third frame, such that the portable electronic device enters a first operation mode. Next, the second frame is located on the second position relative to the third frame, such that the portable electronic device enters a second operation mode. Then, the first frame is located on the third position relative to the second frame, such that the portable electronic device enters a third operation mode.

Based on the above mentioned, in the present application, besides sliding relative to the first body, the second body is capable of being turned over from one surface of the first body to the other surface. Therefore, through the relative movements between the bodies, the portable electronic device is provided with additional appearance states.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
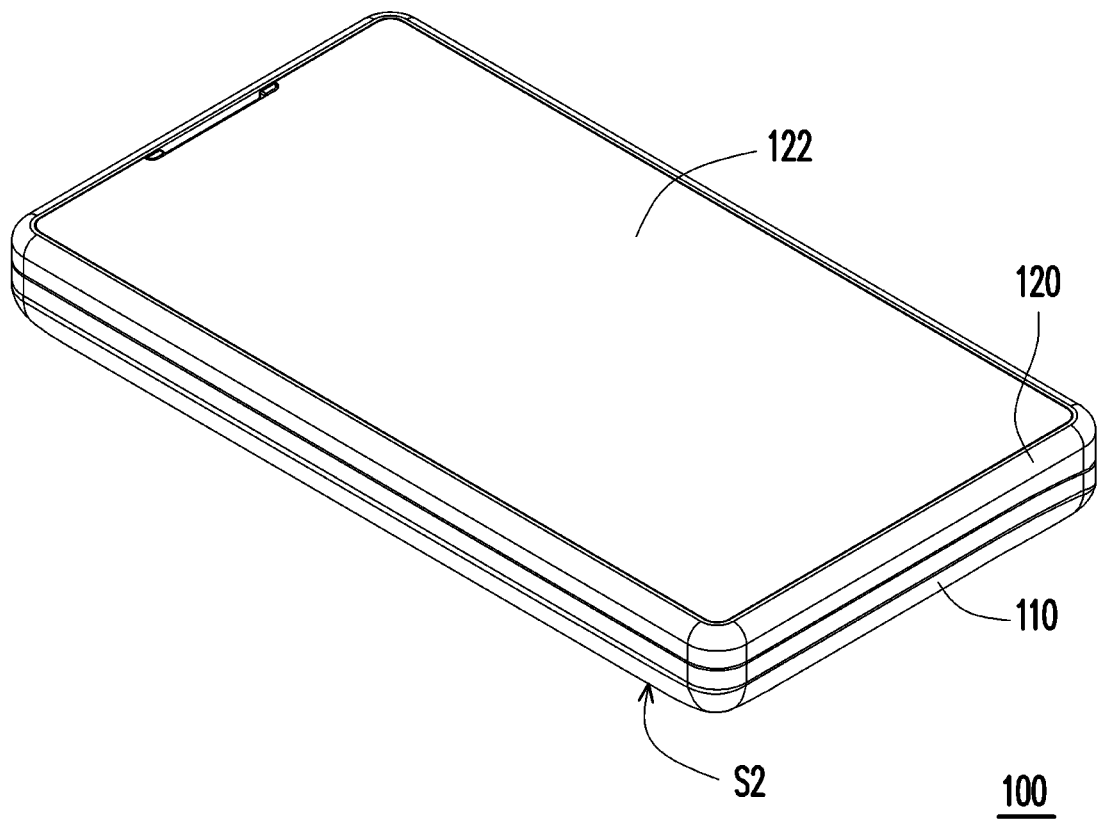
FIGS. 1A to 1C are respectively perspective views of a portable electronic device in three appearance states according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 1B:
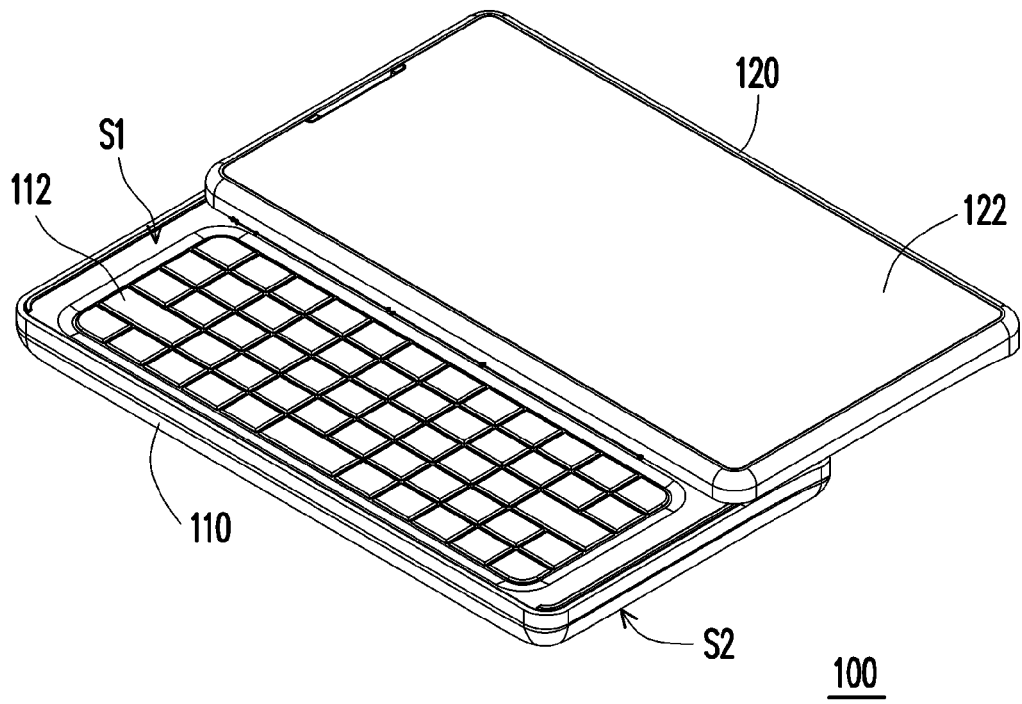
Figure 1C:
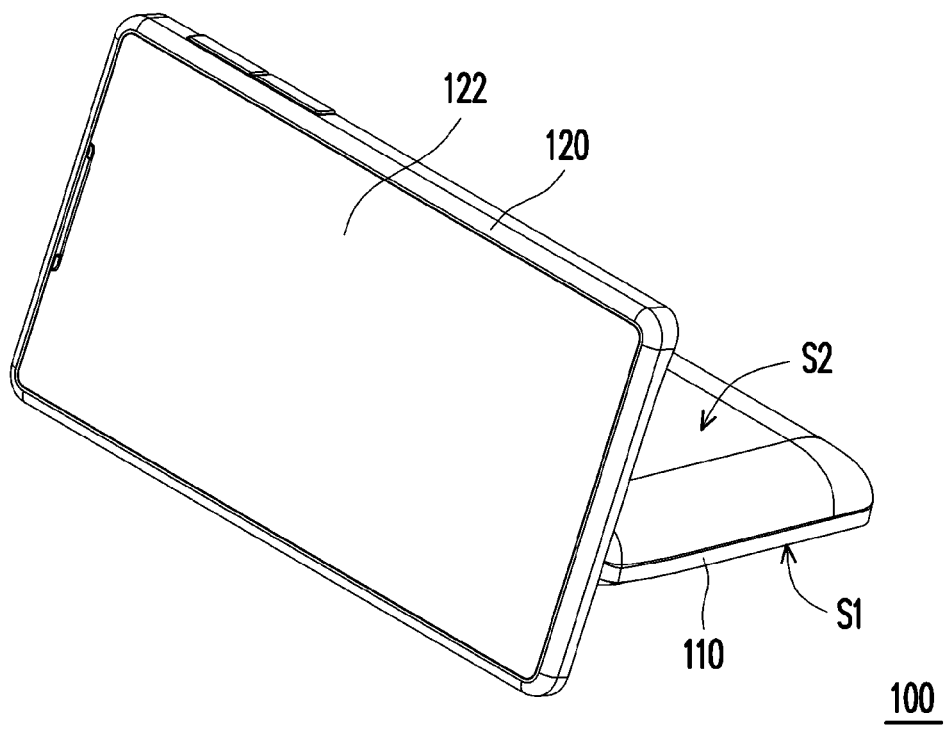
Figure 2A:
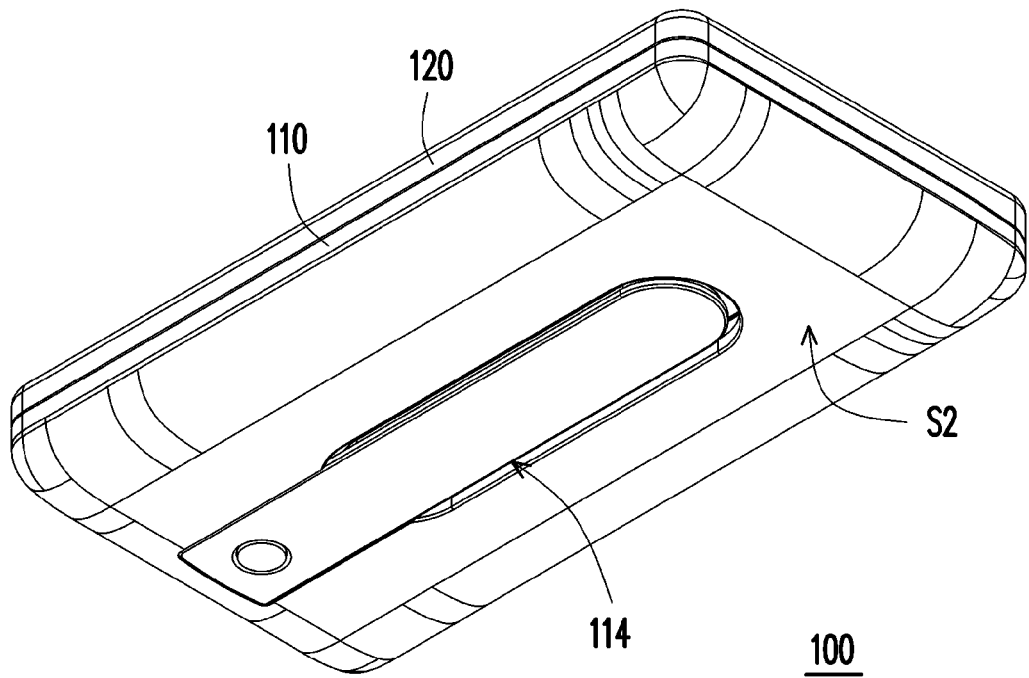
FIGS. 2A to 2C are respectively perspective views of the portable electronic device of FIGS. 1A to 1C from another viewing angle.
Figure 3A:
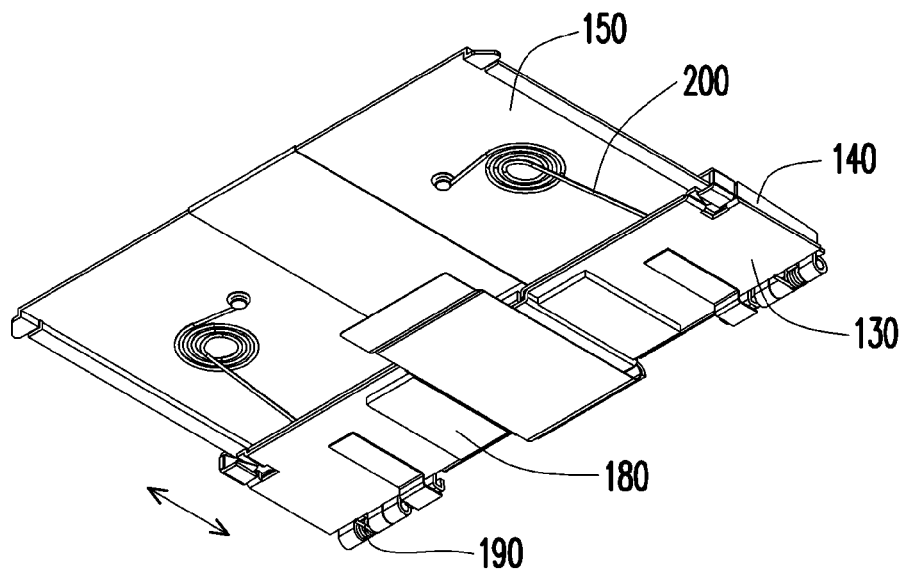
FIGS. 3A to 3C are respectively perspective views of a plurality of components, including frames and other components, of the portable electronic device of FIGS. 2A to 2C.
Figure 2B:
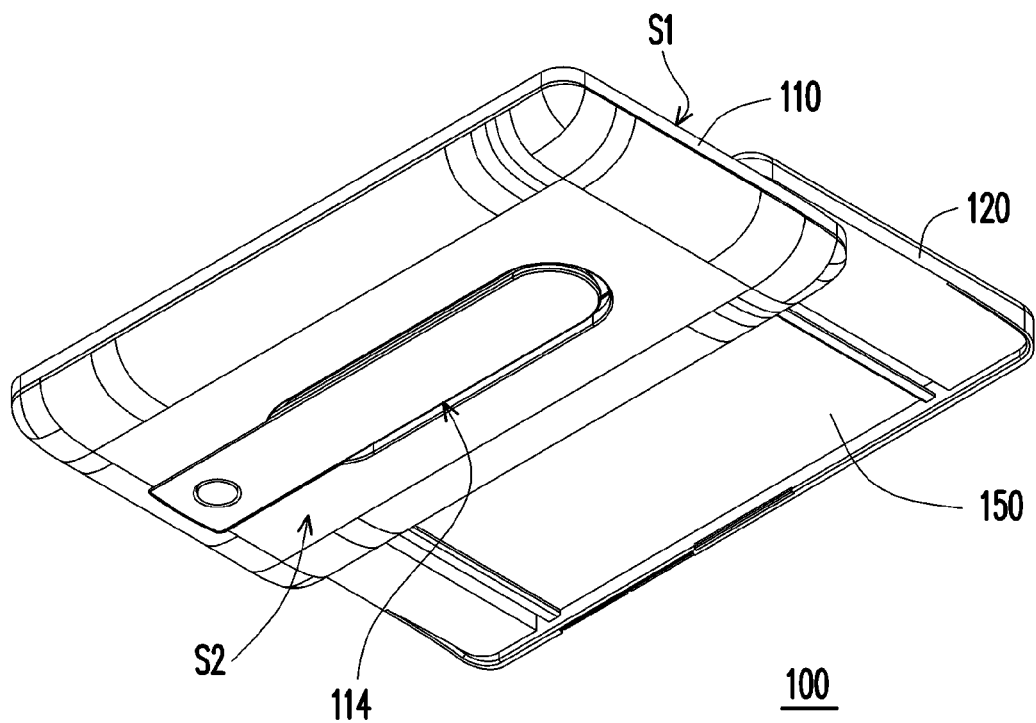
Figure 3B:
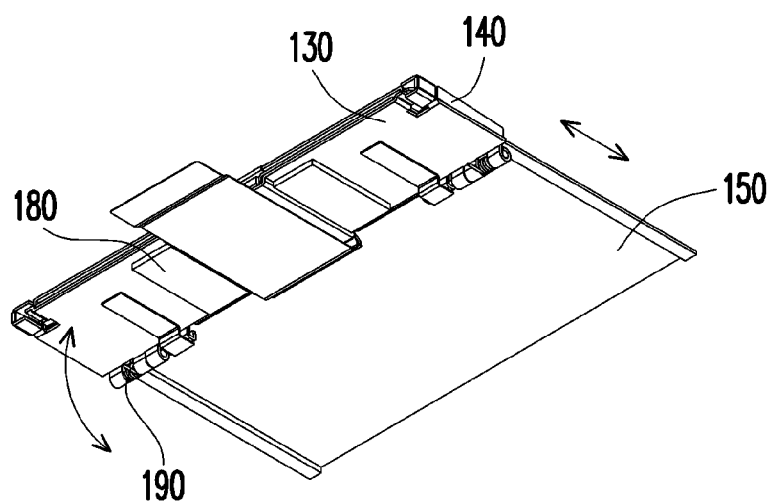
Figure 2C:
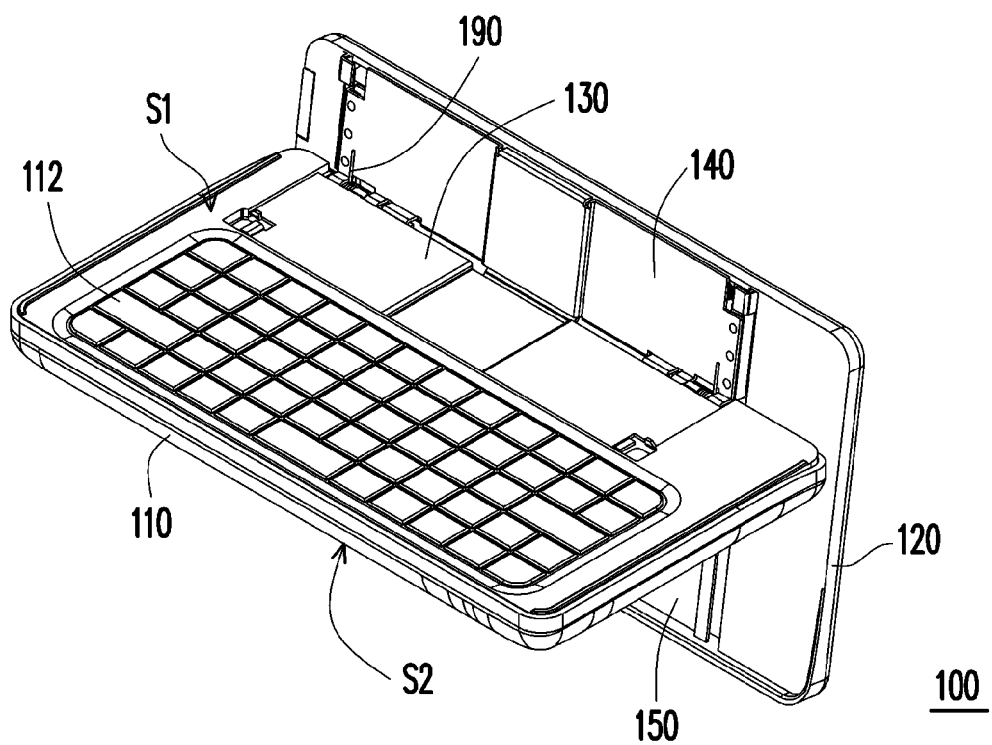
Figure 3C:
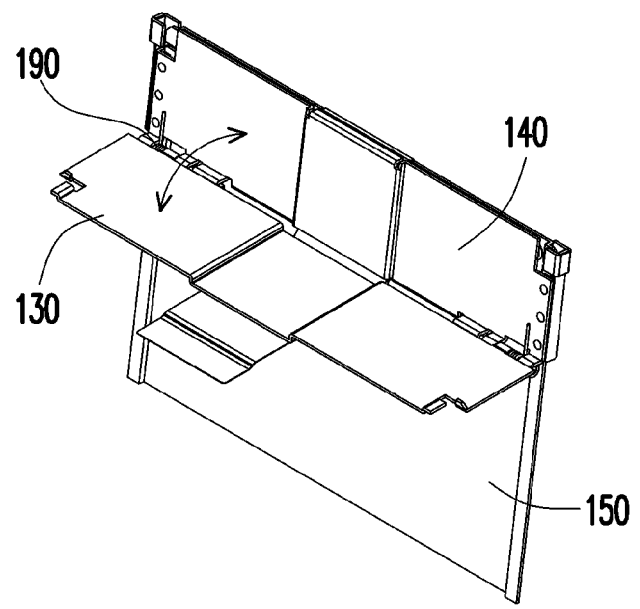

FIGS. 1A to 1C are respectively perspective views of a portable electronic device in three appearance states according to an embodiment of the present invention, FIGS. 2A to 2C are respectively perspective views of the portable electronic device of FIGS. 1A to 1C from another viewing angle, and FIGS. 3A to 3C are respectively perspective views of a plurality of components, including frames and other components, of the portable electronic device of FIGS. 2A to 2C. Referring to FIGS. 1A, 2A, and 3A, a portable electronic device 100 includes a first body 110 and a second body 120. The first body 110 has a first surface S1 and a second surface S2 opposite to each other. When the second body 120 is located on a position of FIG. 1A, the second body 120 is located on the first body 110 and covers the first surface S1.

Referring to FIGS. 2C, and 3A to 3C, the portable electronic device 100 further includes a first frame 130, a second frame 140, and a third frame 150. The first frame 130 is fixed on the first body 110 of FIG. 2C. The second frame 140 is pivoted to the first frame 130. The third frame 150 is fixed on the second body 120 of FIG. 2C. The third frame 150 is slidably coupled to the second frame 140, as shown in FIGS. 3A and 3B. The second frame 140 is capable of sliding between a first position of FIG. 3A and a second position of FIG. 3B relative to the third frame 150, such that the second body 120 is capable of sliding between the positions of FIGS. 2A and 2B relative to the first body 110.

When the second frame 140 is located on the second position of FIG. 3B relative to the third frame 150, the first frame 130 is capable of rotating towards the first position of FIG. 3A from the second position of FIG. 3B to reach a third position of FIG. 3C relative to the second frame 140, such that the second body 120 is capable of being turned over from the first surface S1 to the second surface S2 relative to the first body 110, as shown in FIG. 2C. The second body 120 is capable of being turned over from the first surface S1 to the second surface S2 relative to the first body 110, such that the portable electronic device 100 is provided with an additional appearance state, so that the applications of the portable electronic device 100 are further expanded when being used together with the software.

Figure 4:
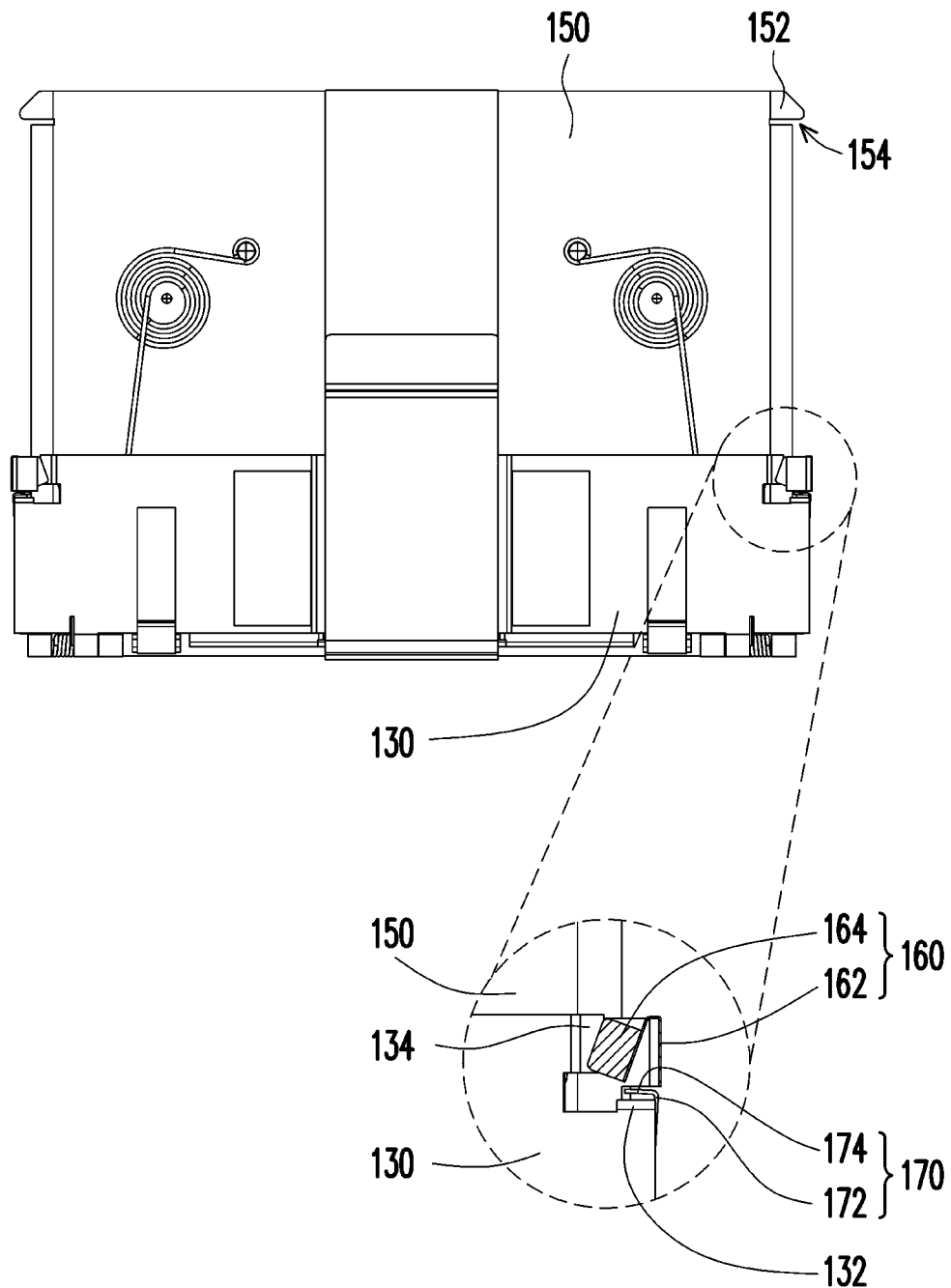
FIG. 4 is a bottom view of the frames and other components of FIG. 3A.
Figure 5A:
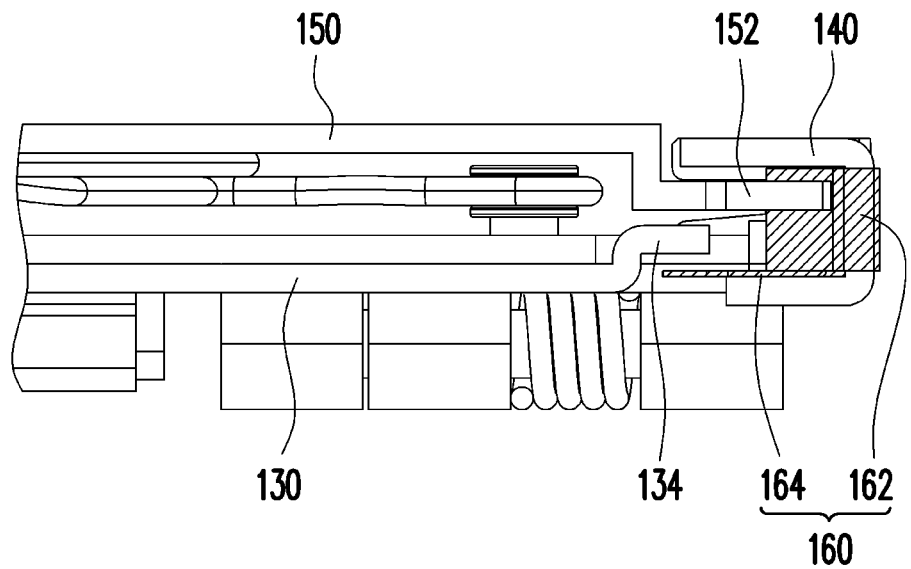
FIG. 5A is a partial front view of the frames and other components of FIG. 3A.

FIG. 4 is a bottom view of the frames and other components of FIG. 3A, and FIG. 5A is a partial front view of the frames and other components of FIG. 3A. In order to clearly show relationships among the components, a first limiting part 160 is represented by slashes here. Referring to FIGS. 4 and 5A, in this embodiment, the portable electronic device 100 further includes a first limiting part 160, connected to the second frame 140. The first limiting part 160 includes a first elastic portion 162 and a first limiting portion 164. The first elastic portion 162 is fixed on the second frame 140. The first limiting portion 164 extends from the first elastic portion 162. The first frame 130 has a stopping portion 134. Therefore, when the second frame 140 slides relative to the third frame 150, the first limiting part 160 interferes with the stopping portion 134, so as to limit the rotation of the first frame 130 relative to the second frame 140.

Figure 5B:
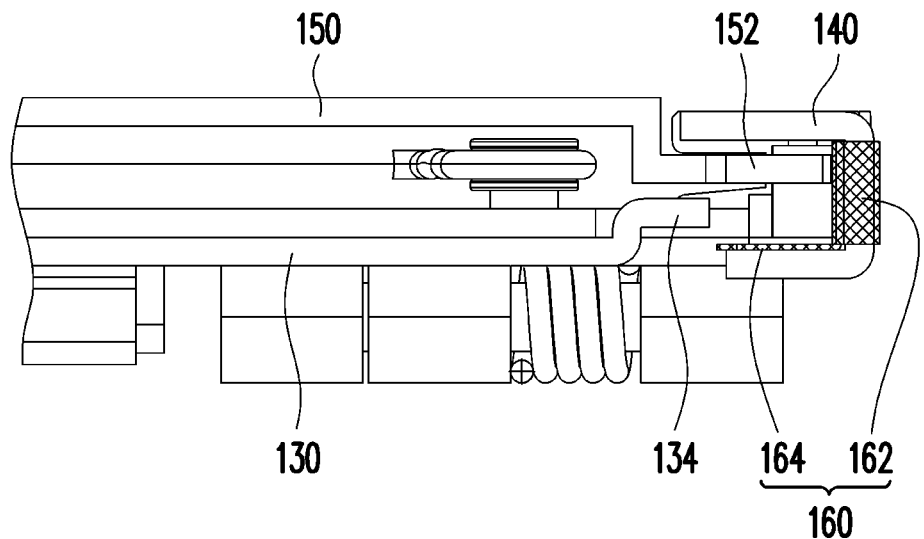
FIG. 5B is a partial front view of the frames and other components of FIG. 3B.

FIG. 5B is a partial front view of the frames and other components of FIG. 3B. Referring to FIGS. 4, 5A, and 5B, in this embodiment, the third frame 150 has a first restraining part 152, and when the second frame 140 slides to the second position of FIG. 3B relative to the third frame 150, the first restraining part 152 releases the limiting effect of the first limiting part 160 on the rotation of the first frame 130. Particularly, when the second frame 140 slides to the second position of FIG. 3B relative to the third frame 150, the first restraining part 152 pushes the first elastic portion 162, so as to release the interference relationship between the first limiting portion 164 and the stopping portion 134.

Figure 6A:
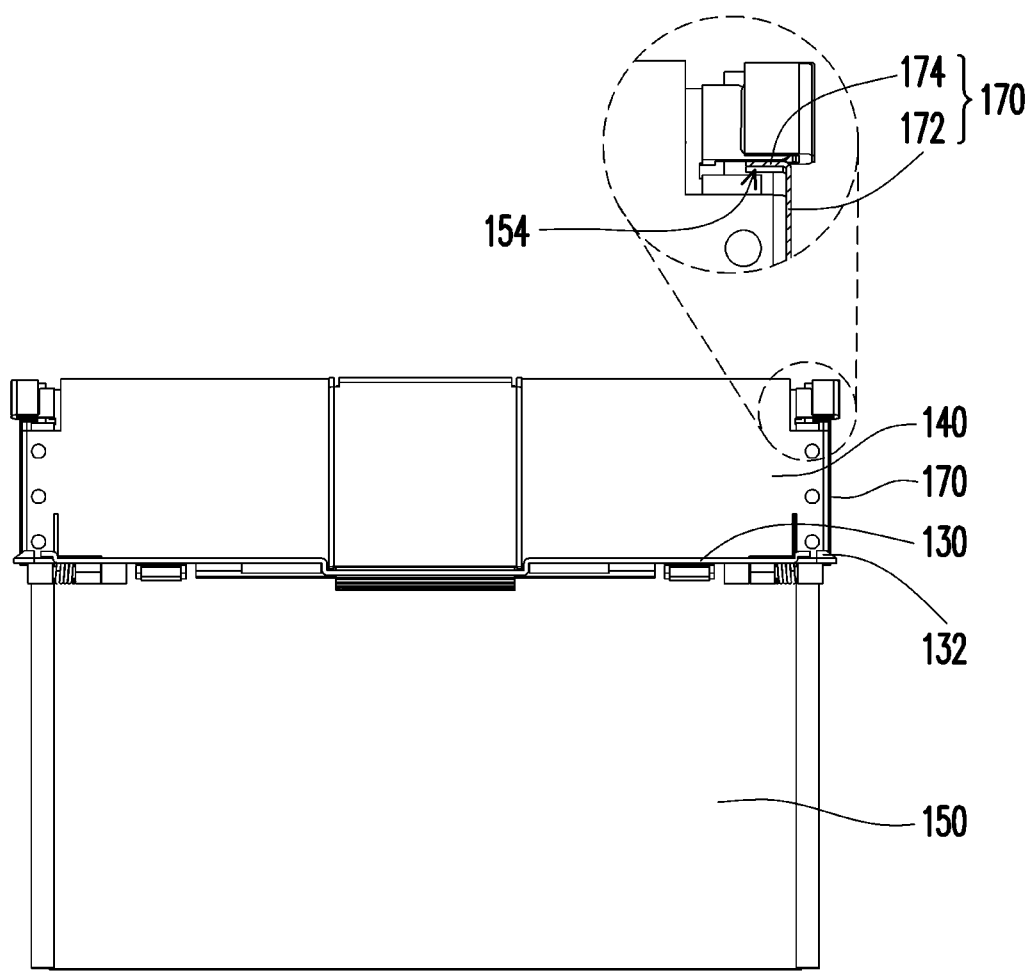
FIG. 6A is a front view of the frames and other components of FIG. 3C.
Figure 6B:
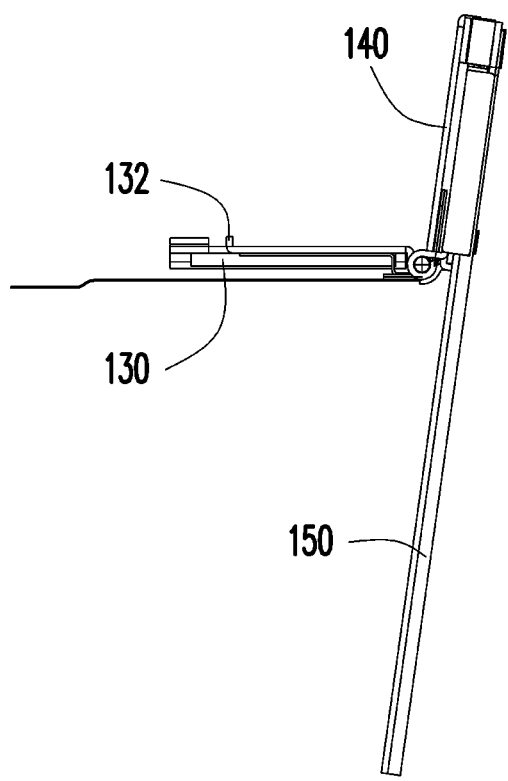
FIG. 6B is a side view of the frames and other components of FIG. 6A.

FIG. 6A is a front view of the frames and other components of FIG. 3C, and FIG. 6B is a side view of the frames and other components of FIG. 6A. Referring to FIGS. 6A and 6B, in this embodiment, the portable electronic device 100 further includes a second limiting part 170, connected to the second frame 140. The second limiting part 170 includes a second elastic portion 172 and a second limiting portion 174. The second elastic portion 172 is fixed on the second frame 140. The second limiting portion 174 extends from the second elastic portion 172. The third frame 150 has a snapping portion 154, which is also shown in FIG. 4. Therefore, when the first frame 130 rotates relative to the second frame 140, the second limiting portion 174 interferes with the snapping portion 154, so as to limit the rotation of the second frame 140 relative to the third frame 150.

Referring to FIGS. 6A and 6B, in this embodiment, the first frame 130 has a second restraining part 132. When the first frame 130 rotates relative to the second frame 140, the second restraining part 132 releases the limitation effect of the second limiting part 170 on the sliding motion of the third frame 150. Particularly, when the first frame 130 rotates to the second position of FIG. 3B relative to the second frame 140, the second restraining part 132 pushes the second elastic portion 172, so as to release the interference relationship between the second limiting portion 174 and the snapping portion 154.

Referring to FIG. 3B, in this embodiment, the first frame 130 and the second frame 140 are attached to each other under a magnetic attraction force, such that the user can conveniently control the rotation of the first frame 130 relative to the second frame 140. The portable electronic device 100 further includes a magnetic part 180 arranged on the first frame 130, and the second frame 140 correspondingly has magnetic susceptibility, such that the first frame 130 is capable of being attached on the second frame 140. However, in another embodiment (not shown), two magnetic parts are respectively arranged on the first frame 130 and the second frame 140, and the first frame 130 and the second frame 140 are attached to each other under the magnetic attraction force between the two magnetic parts.

Referring to FIGS. 3A to 3C, the portable electronic device 100 further includes a first driving part 190 connected between the first frame 130 and the second frame 140. In this embodiment, the first driving part 190 is, for example, a torsion spring. When the second frame 140 is located between the first position of FIG. 3A and the second position of FIG. 3B relative to the third frame 150, the first driving part 190 is compressed. Once the second frame 140 reaches the second position of FIG. 3B, the first limiting part 160 releases the limiting relationship with the first frame 130, such that the first driving part 190 drives the first frame 130 and the second frame 140 to rotate relative to each other. Particularly, when the first frame 130 and the second frame 140 are attached to each other under the magnetic attraction force, an elastic force of the first driving part 190 is insufficient for separating the first frame 130 from the second frame 140. However, when the user rotates the second body 120, the elastic force of the first driving part 190 enables the portable electronic device 100 to maintain the state of FIG. 1C.

In addition, referring to FIGS. 2A to 2C, the first body 110 has a keyboard 112 and a loudspeaker opening 114. The keyboard 112 is, for example, a QWERTY keyboard, and is located on the first surface S1. The loudspeaker opening 114 is located on the second surface S2. When the second body 120 is located on a position of FIG. 2A relative to the first body 110, the keyboard 112 is covered by the second body 120. When the second body 120 is located on a position of FIG. 2B relative to the first body 110, the keyboard 112 is exposed out of the first body 110. It should be mentioned that, since the loudspeaker opening 114 is located on the second surface S2 of the first body 110, when the second body 120 is located on a position of FIG. 2C relative to the first body 110, the loudspeaker opening 114 is exposed out of the first body 110. In this way, the sounds produced by a loudspeaker (not shown) configured within the portable electronic device 100 are transmitted from the loudspeaker opening 114 without being interfered, thereby achieving a desirable sound quality.

In addition, referring to FIG. 3A, the portable electronic device 100 further includes at least one second driving part 200 connected between the second frame 140 and the third frame 150. In this embodiment, the second driving part 200 is, for example, a torsion spring or any other device capable of providing an elastic force. When the second frame 140 slides relative to the third frame 150, the second driving part 200 provides a driving force on the second frame 140 and the third frame 150, such that the second body 120 and the first body 110 can slide with respect to each other in a semi-auto sliding manner.

In another embodiment, the present invention provides an operation method, applicable to operate the portable electronic device 100, in which the structure of the portable electronic device 100 has already been described in the above embodiments, so it is not described here repeatedly. Referring to FIGS. 1A to 1C, the operation method enables the portable electronic device 100 to have three different appearance states as follows.

1. The second frame 140 is located on the first position of FIG. 3A relative to the third frame 150, such that the relative position between the second body 120 and the first body 110 is as shown in FIG. 1A, and the portable electronic device 100 enters a first operation mode. Furthermore, the second body 120 has a screen 122, which may be a touch screen. Therefore, the user can manipulate the portable electronic device 100 through the screen 122 in the first operation mode. In this embodiment, the first operation mode includes a phone mode.

2. The second frame 140 is located on the second position relative to the third frame 150, such that the relative position between the second body 120 and the first body 110 is as shown in FIG. 1B, and the portable electronic device 100 enters a second operation mode, including an input mode. In the second operation mode, the keyboard 112 is exposed out of the first body 110, such that the user can conveniently manipulate the portable electronic device 100 through the screen 122 and the keyboard 112.

3. The first frame 130 is located on the third position relative to the second frame 140, such that the relative position between the second body 120 and the first body 110 is as shown in FIG. 1C, and the portable electronic device 100 enters a third operation mode, including a multimedia playing mode. It should be noted that, at this time, the loudspeaker opening 114 (as shown in FIGS. 2A and 2B) of the portable electronic device 100 is located on the second surface S2, such that the portable electronic device 100 can provide a high sound output quality when playing audio/video products. In addition, when the portable electronic device 100 is placed on a surface of a desk, the angle of the screen 122 is also suitable for being viewed by the user, such that the third operation mode is suitable for playing audio/video products or holding video conferences.

To sum up, according to the embodiments of the present invention, in the portable electronic device, the second body is capable of sliding relative to the first body through the frames, and is capable of being turned over from the first surface of the first body to the second surface thereof relative to the first body. Therefore, as compared with the prior art, the portable electronic device in the above embodiments is further provided with an additional appearance state, so that the operation scope of the portable electronic device is further expanded when being used together with the software.

Furthermore, since the loudspeaker opening of the second body is located on the second surface, when the second body is turned over relative to the first body, and the portable electronic device enters the third operation mode (for example, multimedia playing mode), and is placed on the platform, the loudspeaker opening is exposed out of the second body and is not covered by the platform, such that the high sound output quality is maintained, and thus the third operation mode is suitable for playing audio/video products.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A portable electronic device, comprising:
a first body comprising a first surface, a second surface, a keyboard, and a loudspeaker opening, wherein the first surface and the second surface are opposite to each other, the keyboard is located on the first surface, and the loudspeaker opening is disposed on the second surface;
a second body comprising a screen;
a first frame fixed on the first body;
a second frame pivoted to the first frame; and
a third frame fixed on the second body and slidably coupled to the second frame, wherein the second frame slides between a first position, an end of a short edge of the third frame, and a second position, the other end of the short edge of the third frame, parallel to the third frame, when the second frame moves to the first position, the first surface is covered by the second body, and when the second frame moves to the second position relative to the third frame, at least parts of the first surface is exposed out of the first body, and the first frame rotates towards a third position from the second position relative to the second frame to rise from the second frame in an angle, such that the second body is turned over from the first surface to the second surface of the first body, the first body and the second body stand on a platform with their edges touching the platform and the keyboard on the first surface faces the platform, the loudspeaker opening on the second surface is back to the platform, and the first body is in the back of the screen.

2. The portable electronic device according to claim 1, wherein the third frame comprises a first restraining part, and the portable electronic device further comprises a first limiting part connected to the second frame, and when the second frame slides relative to the third frame between the first position and the second position, the first limiting part limits a rotation of the first frame relative to the second frame to prevent the first frame from rotating to the third position, wherein the first frame comprises a stopping portion, and the first limiting part comprises a first elastic portion fixed on the second frame and a first limiting portion extending from the first elastic portion and located within a rotation scope of the stopping portion, when the second frame slides to the second position from the first position relative to the third frame, the first restraining part pushes the first elastic portion, such that the first elastic portion moves the first limiting portion out of the rotation scope of the stopping portion.

3. The portable electronic device according to claim 1, further comprising:
a second limiting part connected to the second frame, wherein the first frame comprises a second restraining part, and when the first frame rotates relative to the second frame between the second position and the third position, the second limiting part limits a sliding motion of the second frame relative to the third frame, wherein the third frame comprises a snapping portion, and the second limiting part comprises a second elastic portion fixed on the second frame and a second limiting portion extending from the second elastic portion, when the first frame rotates relative to the second frame between the second position and the third position, the second limiting portion interferes with the snapping portion, and when the first frame rotates to the second position relative to the second frame, the second restraining part pushes the second elastic portion, so as to release an interference between the second limiting portion and the snapping portion.

4. The portable electronic device according to claim 1, wherein the first frame and the second frame are attached to each other under a magnetic attraction force.

5. The portable electronic device according to claim 1, further comprising:
a first driving part connected to the first frame and the second frame and used for driving the first frame and the second frame to rotate with their edges relative to each other.

6. The portable electronic device according to claim 5, wherein the first driving part comprises a torsion spring.

7. The portable electronic device according to claim 1, wherein when the second frame is located on the first position relative to the third frame, the keyboard is covered by the second body, and when the second frame is located on the second position relative to the third frame, the keyboard is exposed out of the first body.

8. The portable electronic device according to claim 1, further comprising:
at least one second driving part arranged between the second frame and the third frame.

9. The portable electronic device according to claim 8, wherein the second driving part comprises a torsion spring.

10. An operation method, used for operating the portable electronic device according to claim 1, comprising:
making a second frame be located on a first position relative to a third frame, such that the portable electronic device enters a first operation mode;
making the second frame be located on a second position relative to the third frame, such that the portable electronic device enters a second operation mode; and
making a first frame be located on a third position relative to the second frame, such that the portable electronic device enters a third operation mode.

11. The operation method according to claim 10, wherein the first operation mode comprises a phone mode.

12. The operation method according to claim 10, wherein the second operation mode comprises an input mode.

13. The operation method according to claim 10, wherein the third operation mode comprises a multimedia playing mode.

14. The operation method according to claim 10, wherein the second body is turned over from the first surface to the second surface of the first body with a turning angle greater than 90 degrees.

* * * * *